C. W. BARRETT.
VEHICLE WHEEL.
APPLICATION FILED JULY 8, 1911.

1,034,382.

Patented July 30, 1912.

2 SHEETS—SHEET 1.

WITNESSES

INVENTOR
Charles W. Barrett
BY
ATTORNEYS

C. W. BARRETT.
VEHICLE WHEEL.
APPLICATION FILED JULY 8, 1911.

1,034,382.

Patented July 30, 1912.

2 SHEETS—SHEET 2.

WITNESSES
George Bamfay
John K. Bradury

INVENTOR
Charles W. Barrett
BY Munn & Co.
ATTORNEYS

UNITED STATES PATENT OFFICE.

CHARLES WHITFIELD BARRETT, OF SAN JOSE, CALIFORNIA.

VEHICLE-WHEEL.

1,034,382. Specification of Letters Patent. Patented July 30, 1912.

Application filed July 8, 1911. Serial No. 637,445.

*To all whom it may concern:*

Be it known that I, CHARLES W. BARRETT a citizen of the United States, and a resident of San Jose, in the county of Santa Clara and State of California, have invented a new and Improved Vehicle-Wheel, of which the following is a full, clear, and exact description.

This invention relates to vehicle wheels for use with automobiles and for other purposes, and has reference more particularly to a vehicle wheel comprising a hub, a pneumatic cushion surrounding the hub, a felly, spokes connecting the cushion and the felly, and a solid cushion member within the pneumatic cushion.

The object of the invention is to provide a simple, strong and durable vehicle wheel which can be used in connection with automobiles and for other like purposes, which includes a pneumatic cushion similar to the pneumatic tires now commonly employed, and serving to lend resiliency and shock-absorbing character to the wheel, in which the pneumatic cushion is, however, protected against excessive wear and does not come into contact directly with the ground, in which the parts are securely though separably held together and assembled, and in which, the pneumatic cushion element becoming deflated, a solid cushion element becomes effective and serves to replace the pneumatic cushion until it is convenient to reinflate the latter.

The invention consists in the construction and combination of parts to be more fully described hereinafter and particularly set forth in the claims.

Reference is to be had to the accompanying drawings forming a part of this specification, in which similar characters of reference indicate corresponding parts in all the figures, and in which—

Figure 1:
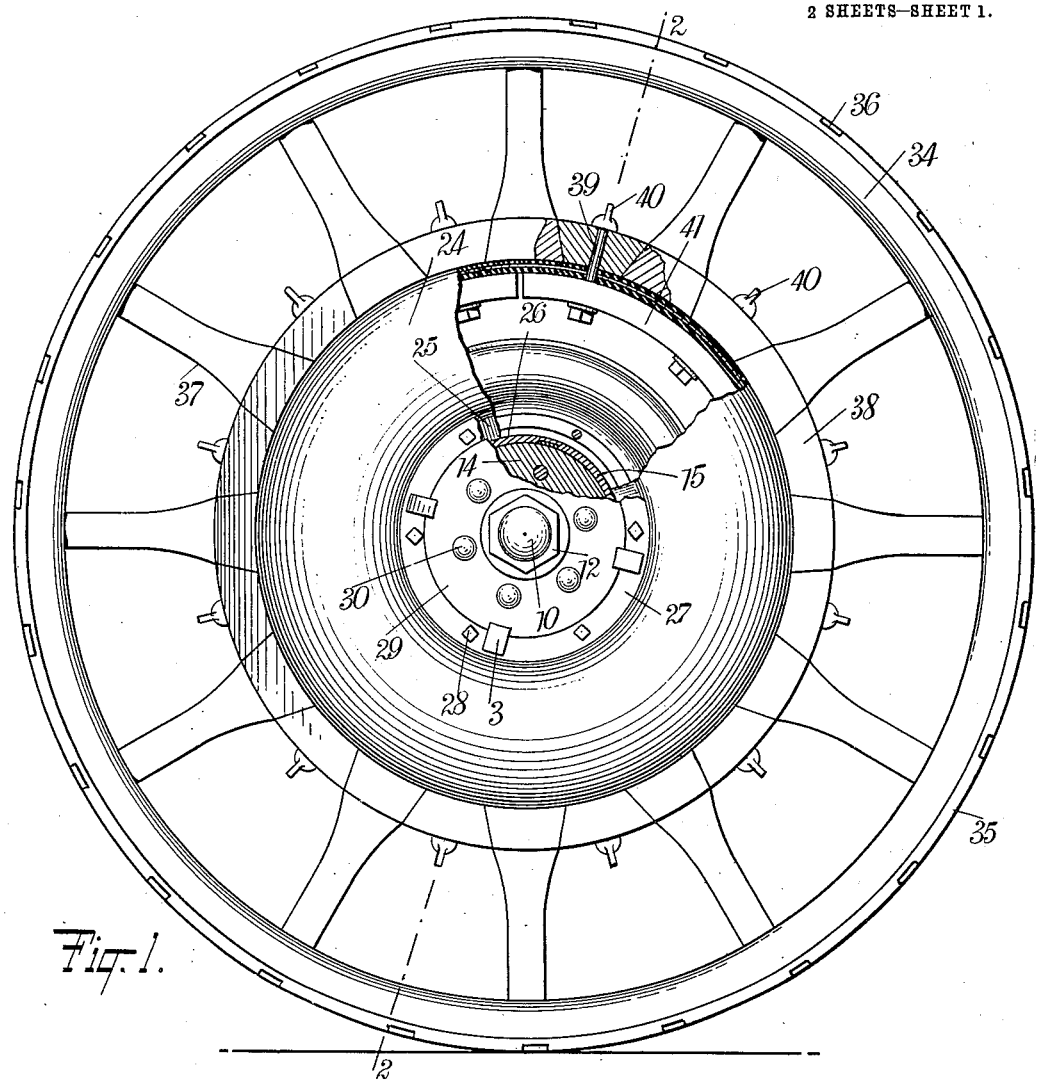
Figure 3:
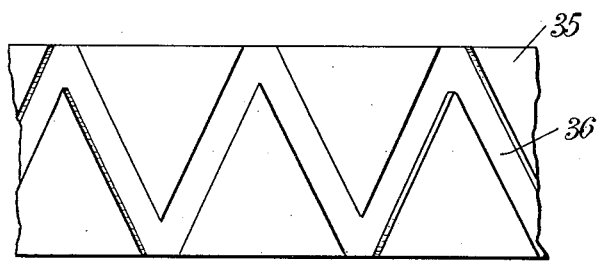
Figure 2:
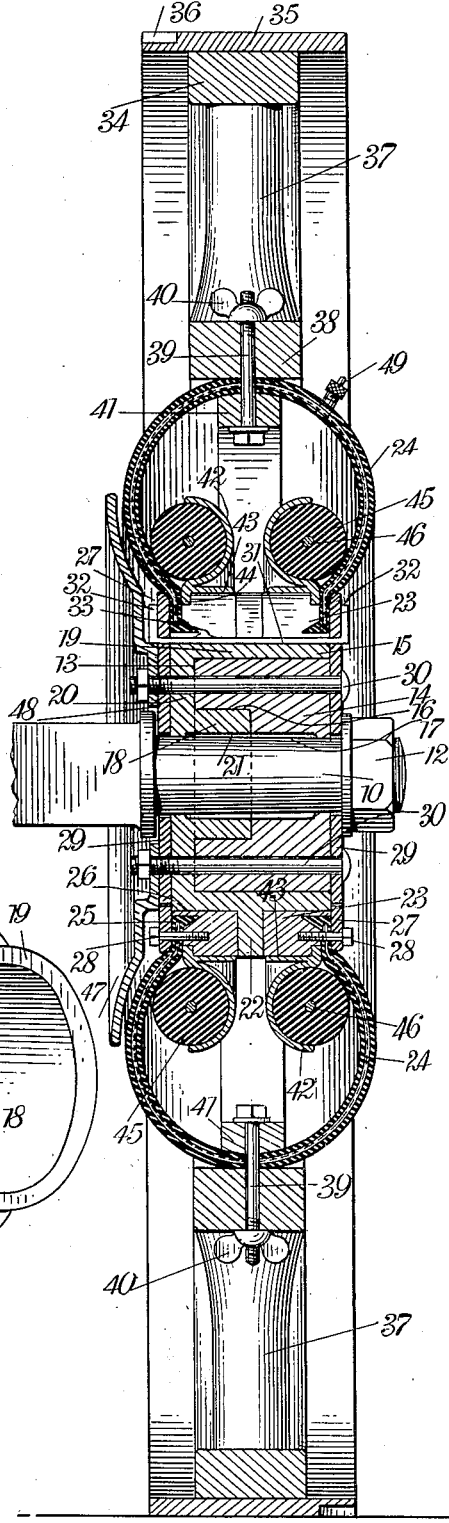
Figure 4:
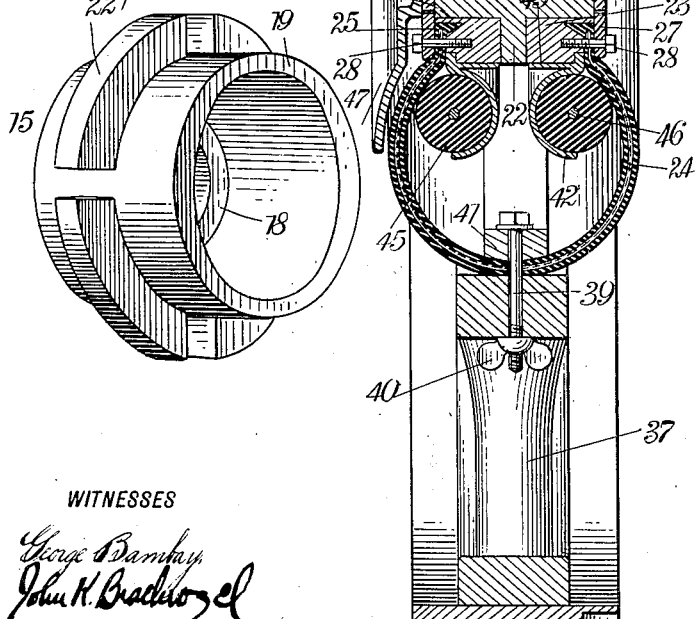

Figure 1 is a side elevation of an embodiment of my invention having parts broken away, and showing certain of the parts in cross section; Fig. 2 is an enlarged, transverse section on the line 2—2 of Fig. 1; Fig. 3 is a fragmentary, plan view of a part of the tread of the wheel, showing a surface designed for efficient tractive action; and Fig. 4 is a perspective view of a detail showing a portion of the hub of the wheel.

Before proceeding to a more detailed explanation of my invention it should be clearly understood that while the vehicle wheel is particularly designed for use with motor-driven vehicles, it can also be advantageously applied to other purposes, for example, it can be conveniently used with vehicles of other types. As is well known, the resilient and shock-absorbing action of a pneumatic cushion such as a pneumatic tire, cannot be attained by employing spring wheels or cushion tires alone. The pneumatic tire which has these obvious advantages is, however, easily injured, and subject to excessive wear. In my wheel, I employ a pneumatic cushion which is so positioned that it is effective to absorb shocks and to cushion the wheel, but is so placed that it is not subject to excessive wear owing to the fact that it does not come into contact with the ground or other surface upon which the wheel rolls. The particular construction of my wheel, which will be described hereinafter, renders possible the location of the cushion between the felly and the hub, so that the wheel can be easily assembled and the cushion can be expeditiously repaired or replaced when necessary. I employ furthermore, within the pneumatic cushion, one or more solid cushions which become effective if the pneumatic cushion becomes accidentally deflated, so that there is no necessity for at once stopping for repair. Certain of the details of construction, shown for example herewith, form no part of the invention, and can be varied in accordance with individual preference and special conditions, without deviating from the essence of the invention as defined in the appended claims.

Referring more particularly to the drawings I have shown for example, an axle spindle 10 of a vehicle axle 11, the spindle having at the end the usual retaining nut 12. Mounted upon the axle spindle is the wheel hub 13, comprising two sections 14 and 15. The former is the inner section, and like the outer section 15 is of annular form. The section 14 has an undercut, annular groove 16 at one edge, and at the inner surface is provided with an annular recess 17 to facilitate the lubrication of the axle. The hub section 15 has an inner, annular flange 18 adapted to be received within the groove or cutaway part 16, and has, furthermore, an outer, annular flange 19 which extends over the section 14, so that the latter is virtually received within the outer section. The flanges 18 and 19 are spaced radially and are connected by a web 20. At the inside, the section 15 is provided with a recess 21 which registers with the recess 17, and likewise, assists in the lubrication of the axle. The outer hub section 15 has separated, centrally disposed and radially extended ribs 22, which are clearly shown in Fig. 4, and serve a purpose which will appear hereinafter.

Removably associated with the hub, and surrounding the same, are annular clencher members 23 positioned at opposite sides of the ribs 22 and adjacent to the same. The pneumatic cushion 24 is similar in form to pneumatic tires now commonly employed in connection with automobiles, and is fashioned preferably from rubber and fabric. It is of annular form and has clencher flanges 25 which are received in correspondingly formed edge grooves 26 of the clencher members 23. Locking rings 27 are arranged at the opposite sides of the cushion flanges, against the hub, and are secured in place by screws or bolts 28. As will be readily understood, they serve to clamp the flanges of the pneumatic cushion in position. Hub plates 29 of annular form are arranged at opposite sides of the hub, and are secured in place by means of suitable bolts 30 which pass through openings provided for the purpose in the hub plates and the hub sections. I employ in addition to the retaining rings, U-shaped keepers 31 each of which is received in a space between two adjacent ribs 22 of the hub and extends outwardly at the sides of the hub, having the ends 32 arranged at the outside of the locking rings 27, to assist in holding these in position. The keepers, furthermore, tend to prevent circumferential movement of the cushion in that the clencher members 23 have transverse grooves 33 through which the keepers extend. The ribs 22 prevent circumferential movement of the keepers.

I employ a wheel felly 34 of any suitable form, having associated therewith at the outer periphery a tread 35 preferably fashioned from steel, and having continuous, V-shaped grooves 36, to increase the tractive action. Short spokes 37 extend inwardly in radial directions from the felly 34, and engage the cushion 24. Spacing blocks 38 are arranged between the adjacent spokes, the ends of which are outwardly tapered, the blocks being oppositely tapered, and are secured by means of bolts 39 having wing nuts 40, to the cushion. Within the latter is arranged a plurality of separated, arcuate bars 41 through which the bolts 39 pass, which serve in holding in relative positions the cushion and the spokes. The fact that the arcuate bars are separated, permits the cushion to flex as necessary.

Within the pneumatic cushion at each side thereof, is arranged a solid cushion holder consisting of a part 42 of arcuate cross section and associated therewith at one edge, two flanges 43 and 44, respectively, arranged at right angles and engaging the clencher blocks or members 23, the latter being provided with cutaway parts or grooves for the purpose. The holders are oppositely disposed, and each is provided with an annular, solid cushion 45 fashioned from rubber or other suitable material and having a central wire or reinforcing member 46. The solid cushions are preferably of circular cross section and fit snugly within the arcuate parts of the holders, and are in juxtaposition with the sides of the pneumatic.

If so desired, I can employ side or guard plates 47, one only of which is shown for convenience, in Fig. 2. The plates are of dished form and have central openings 48 through which an axle extends. They are secured in place by the bolts 30 and extend radially to substantially the median lines of the pneumatic cushion sides. The latter is provided with an air inlet valve 49 by means of which it can be easily inflated in the usual manner. If it becomes accidentally deflated by puncture or blow-out, the solid cushions become effective and the other can be continued in use.

Having thus described my invention, I claim as new, and desire to secure by Letters Patent:

1. A vehicle wheel comprising a hub, a pneumatic clencher cushion surrounding said hub and having said hub extending into it, clencher devices associated with said hub for securing said cushion in position, a felly about said cushion and spaced radially therefrom, inwardly extending spokes secured to said felly and in engagement with said cushion, a holder within said pneumatic cushion and secured upon said hub, and a solid cushion held in place by said holder.

2. A vehicle wheel comprising a hub having radially extended, spaced ribs, a clencher pneumatic cushion about said hub, clencher devices for securing said cushion in position, keepers positioned between said ribs and serving to hold said cushion against circumferential movement, and a felly about said cushion.

3. A vehicle wheel comprising a hub consisting of two interlocking sections bolted together, the outer of said sections having radially extended, separated ribs, a clencher pneumatic cushion about said hub, clencher devices for securing said cushion in position, keepers positioned between said ribs and serving to hold said cushion against circumferential movement, and a felly about said cushion.

4. A vehicle wheel comprising a hub consisting of two interlocking sections bolted together, the outer of said sections having radially extended, separated ribs, a clencher pneumatic cushion about said hub, clencher devices for securing said cushion in position, keepers positioned between said ribs and serving to hold said cushion against circumferential movement, a felly about said cushion, spokes extending inwardly from said felly, and means for securing said spokes to said cushion at the periphery thereof, so that said cushion can flex.

5. A vehicle wheel comprising a hub, a hollow cushion member about said hub, a felly about said cushion member and spaced therefrom, spokes extending inwardly from said felly, spacing blocks between said spokes and engaging said cushion member, separated, arcuate members within said cushion member, and bolts securing said spacing blocks and said arcuate members together.

6. In a vehicle wheel, a hub having radially extended, separated ribs, a hollow cushion about said hub, keepers extending transversely of said hub and each positioned between two of said ribs, and locking rings at the outside of said hub and serving to secure said cushion in position, said keepers having ends engaging at the outer sides of said rings.

7. In a vehicle wheel, a hub having substantially extended, separated ribs, a hollow cushion about said hub, keepers extending transversely of said hub and each positioned between two of said ribs, and locking rings at the outside of said hub and serving to secure said cushion in position, said keepers having ends engaging at the outer sides of said rings.

8. A vehicle wheel comprising a sectional hub, a hollow cushion arranged about said hub, keepers extending transversely of said hub and having laterally disposed extremities, locking rings at the sides of said hub and serving to secure said cushion in position, said extremities of said keepers engaging said locking rings, hub plates at the sides of said hub, bolts for securing said hub plates and the sections of said hub together, a felly about said cushion, and spokes connecting said felly and said cushion.

9. A vehicle wheel comprising a sectional hub, a hollow cushion arranged about said hub, keepers extending transversely of said hub and having laterally disposed extremities, locking rings at the sides of said hub and serving to secure said cushion in position, said extremities of said keepers engaging said locking rings, hub plates at the sides of said hub, bolts for securing said hub plates and the sections of said hub together, a felly about said cushion, spokes connecting said felly and said cushion, a guard plate bolted to said hub and extending radially in juxtaposition with said cushion, a holder within said cushion, and a solid, annular cushion member held in place by said holder.

10. In a vehicle wheel, a hub, a hollow cushion about said hub, means for securing said hollow cushion to said hub, a felly about said cushion, spokes connecting said cushion and said felly, a pair of holders arranged within said hollow cushion and each having a flange of arcuate cross section, and a pair of angularly disposed flanges, said last-mentioned flanges engaging said hub, and a solid, annular cushion held in place by each of said arcuate flanges within said hollow cushion.

In testimony whereof I have signed my name to this specification in the presence of two subscribing witnesses.

CHARLES WHITFIELD BARRETT.

Witnesses:
 FRANK I. BRIGDEN,
 VICTOR CHALLEN.